United States Patent [19]
Beetles et al.

[11] Patent Number: 5,349,790
[45] Date of Patent: Sep. 27, 1994

[54] ROOF PIPE ENTRY HATCH

[75] Inventors: Keith Beetles; David Fulford, both of Mississauga, Canada

[73] Assignee: Lexsuco Canada Limited, Etobicoke, Canada

[21] Appl. No.: 960,873

[22] Filed: Oct. 14, 1992

[51] Int. Cl.$^5$ .............................................. E04D 13/14
[52] U.S. Cl. ................................... 52/19; 52/27; 52/198; 52/200; 52/219
[58] Field of Search ................ 52/27, 218, 219, 198, 52/199, 169.8, 169.6, 19, 20, 36, 213, 200

[56] References Cited

U.S. PATENT DOCUMENTS

| | | | |
|---|---|---|---|
| 3,665,661 | 5/1972 | Beckerer | 52/19 X |
| 3,731,448 | 5/1973 | Leo | 52/20 X |
| 3,807,110 | 4/1974 | Kaminski | 52/219 |
| 3,878,655 | 4/1975 | Toth et al. | 52/27 |
| 3,896,595 | 7/1975 | Anghinetti et al. | 52/19 |
| 3,938,284 | 2/1976 | Broadbent et al. | 52/20 |
| 4,213,111 | 7/1980 | Lux, Jr. | 52/20 X |
| 4,439,962 | 4/1984 | Jentoft et al. | 52/200 |
| 4,441,284 | 4/1984 | Bechtold | 52/200 X |
| 4,455,799 | 6/1984 | Jentoft et al. | 52/200 |
| 5,067,291 | 11/1991 | Evensen | 52/219 |

Primary Examiner—Peter M. Cuomo
Assistant Examiner—Suzanne L. Dino
Attorney, Agent, or Firm—Eugene J. A. Gierczak

[57] ABSTRACT

A roof pipe entry hatch which includes side walls defining an opening, a cover hinged to one end of the side walls exteriorally of the opening, and a plurality of apertures presented by the side walls for receiving pipes from the exterior of the side walls into the opening, or handling pipes from the interior to the exterior of the building.

18 Claims, 4 Drawing Sheets

ROOF PIPE ENTRY HATCH

FIELD OF INVENTION

This invention relates to a roof conduit entry hatch having side walls defining an opening where the side walls include apertures for receiving conduits and particularly relates to a roof entry hatch for receiving a plurality of pipes through a plurality of pipe entry holes in the side walls of the roof entry hatch.

BACKGROUND OF THE INVENTION

Individual pipe entries through a deck or roof construction are common and have been water proofed by various suitable flashing materials which are compatible with the roof membrane.

For example, it is common to observe a cluster of two, four or six pipe projections extending vertically through a roof which are water proofed with mastic pans or flashings to contain the projections, which are water proofed with asphalt mastic, foam insulation or rubberized mastics. However, these installations usually require frequent maintenance.

Moreover, roof access hatches are sold which provide human access to the roof surface from the interior of a building. Such roof access hatches may be manufactured with metal curbs and doors which may be insulated and include spring assist latching mechanisms.

For example, U.S. Pat. No. 3,896,595 relates to a roof access hatch which has an upstanding curb defining the well or hatch opening and a cover pivoted to the curb to open and close the hatch. The cover is counterbalanced and includes a latching mechanism which presents minimum obstruction to the well opening.

Moreover, U.S. Pat. No. 3,938,284 relates to a prebuilt transportable cellar having an open bottom, side walls and insulated top and air vents.

Furthermore, U.S. Pat. No. 4,213,111 relates to a transformer unit which comprises a transformer, a ground level base pad having a vertical cable opening therethrough, and an open top, open bottom, and vertical cable vault situated in the earth; where the upper end is received in the pad opening to provide easy access and entering the room from underground electrical cables connected to the transformer.

Yet another arrangement is shown in U.S. Pat. No. 4,473,978 which features a sky light having a doom and is adapted for setting on a curb or suitable means upstanding from the well in a roof structure to be lighted.

Finally, U.S. Pat. No. 4,520,604 relates to a sky light assembly which includes a frame and light transmitting member secured to the frame. These and other prior art devices are not particularly well suited to accommodate multiple pipe entries into a roof of a building. Moreover, water proof problems exist with multiple roof deck penetrations of electrical conduits, coolant and gas pipes, and fire hose connections.

It is an object of this invention to provide an improved roof pipe entry hatch which is particularly well suited to accommodate multiple pipe entries into a roof entry hatch, or multiple pipe entries from the interior of the building to the exterior.

Furthermore, it is an object of this invention to provide a roof pipe entry hatch which has improved water sealing characteristics, and insulates the roof deck opening to the interior.

It is an aspect of this invention to provide a roof conduit entry hatch which includes side walls defining an opening, a cover hinged to one of the side walls exteriorally of the opening, and a plurality of apertures presented by the side walls for receiving conduits through the side walls.

It is another aspect of this invention to provide a roof entry hatch for receiving a plurality of pipes through an opening in the roof which comprises; upstanding side walls defining a curb for enclosing the opening in the roof, structure to fasten the curb to the roof, a plurality of pipe entry openings presented by the curb for receiving a plurality of said pipes through the side wall into said opening, and a cover hinged to one end of the curb moveable between an open position to present entry into the opening and a plurality of conduits, and a closed position so as to bar access to said opening and said conduits.

These and other objects and features shall now be described in relation to the following drawings.

DRAWINGS

DESCRIPTION OF THE INVENTION

Like parts will be given like numbers throughout the Figures.

Figure 1:
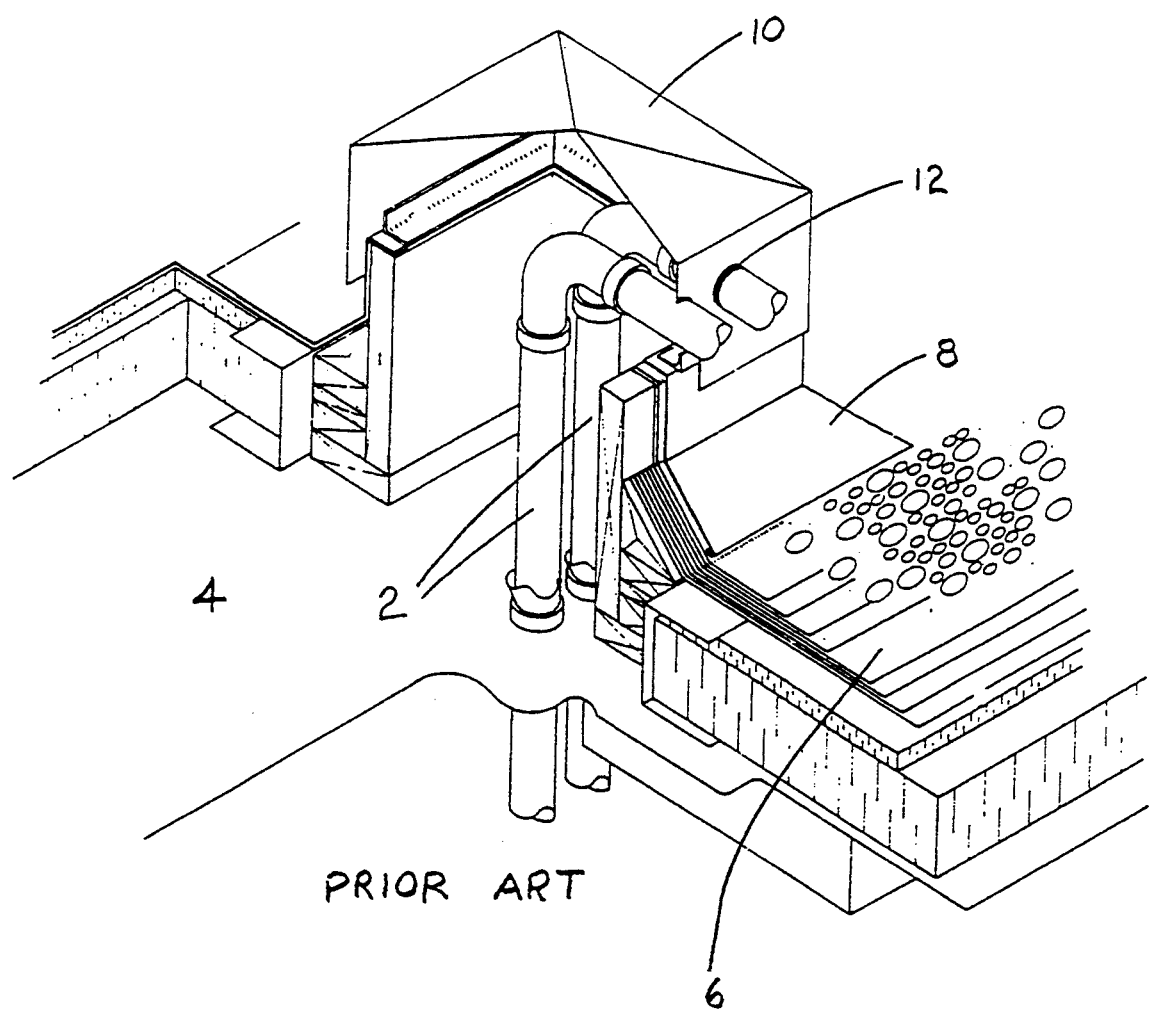
FIG. 1 illustrates a prior art grouping of pipes through a roof membrane.

FIG. 1 illustrates a prior art grouping of pipes 2 which penetrate a roof membrane 4. The prior art structure illustrated in FIG. 1 easily demonstrates the extensive man hours required to assemble the grouping of pipes 2 through the roof member 4 as well as the various sealing materials 6 and flashing 8 materials required to water proof the assembly. Furthermore, the cover 10 utilized in the prior art shown in FIG. 1 requires careful installation to produce a water proof seal in the opening 12 for the pipe 2.

Figure 2:
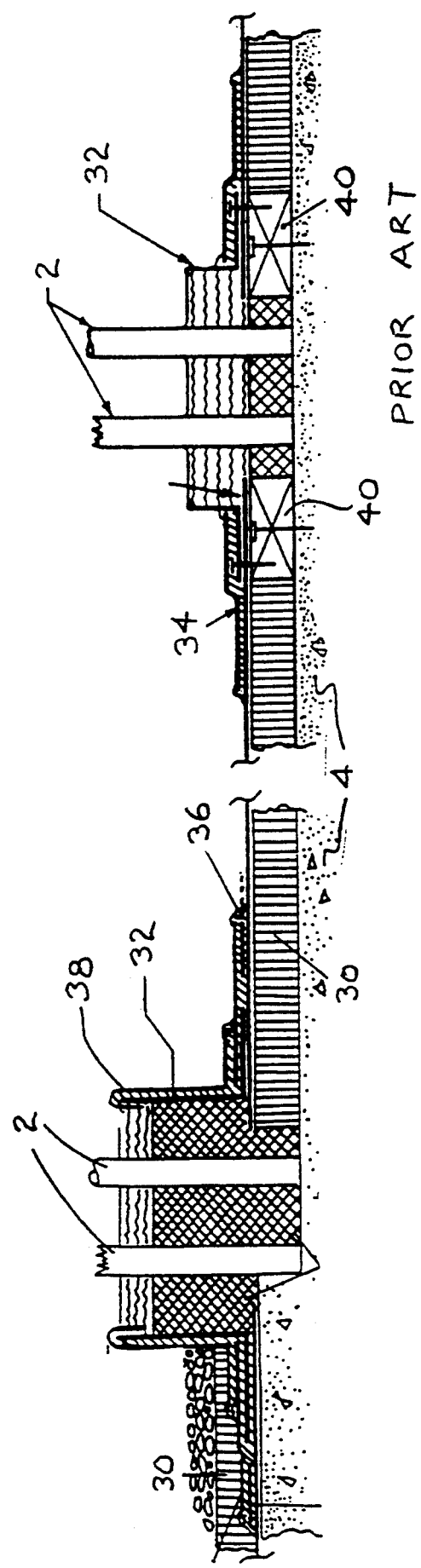
FIG. 2 illustrates another prior art arrangement of mastic pan termination using pourable sealer.

Moreover, FIG. 2 illustrates another prior art arrangement including a plurality of pipes 2 to penetrate a roof deck 4 which utilizes insulation 30, seamless spun aluminium mastic pan 32, a flash 34, sealant caulking 36, and flashing 38. Treated wood 40 is also utilized. The particular elements in FIG. 2 have not been described in great detail since the construction is in accordance with procedures well known to persons skilled in the art.

Figure 3:
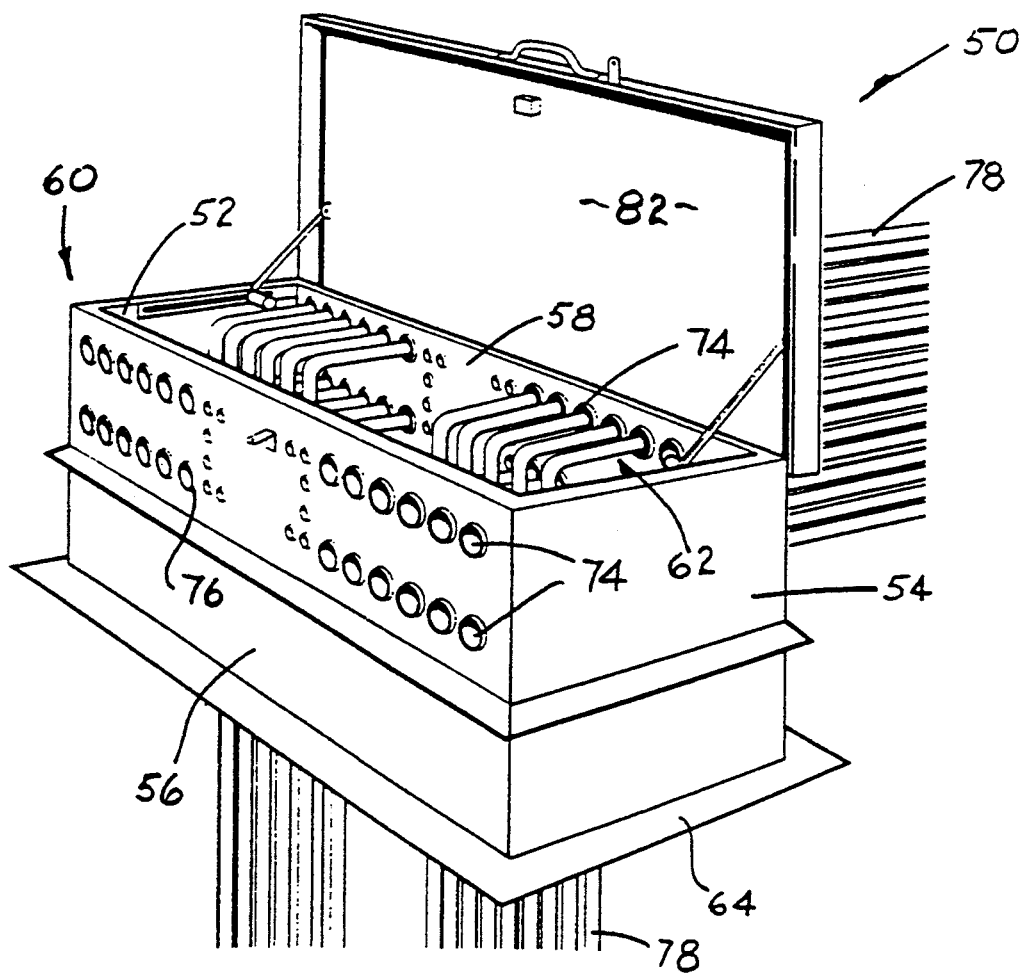
FIG. 3 is a perspective view of the roof pipe entry hatch.

FIG. 3 illustrates the roof pipe entry hatch 50 which generally comprises two standing opposite side walls 52 and 54 connected to two opposite side walls 56 and 58 so as to define a curb generally illustrated as 60 in FIG. 3 which presents a rectangular opening 62 into the roof pipe entry hatch.

The upstanding side walls 52, 54, 56 and 58 present a flange 64.

The roof membrane 66 comprises of roof insulation 68 and roof deck 70. The flange 64 is adapted to be fastened to the roof deck 70 by means of fastening means 72 such as screws or the like.

The upstanding side walls include a plurality of apertures or pipe openings 74. The upstanding side walls 52, 54, 56 and 58 may each include the apertures 74 or as illustrated in FIG. 3 two opposite side walls may include the apertures 74 while the other two opposite side walls 52 and 54 may present a solid wall section. Furthermore the openings may be round or any other configuration. Moreover if the groupings are round, they may have various diameters.

The plurality of apertures 74 include a projecting circumferential edge 76 which are adapted to assist in the sealing to be described more fully herein. Moreover the plurality of apertures 74 may include caps which are adapted to cap or block the plurality of apertures 74 which are not currently being used and permit future knock-out so as to permit the insertion of a conduit or pipe.

The plurality of apertures 74 are adapted to each receive a conduit or pipe 78. This pipe or conduit 78 may originate from the exterior of the roof pipe entry hatch 50 for insertion through the apertures 74 and into the opening 62 of the roof pipe entry hatch 50 so as to penetrate the roof deck 70; or more likely the conduits originate from the interior of a building which conduits are directed upwardly and through the roof deck 70 and roof pipe entry hatch 50 and then horizontally across the roof, and the conduits may then be directed to another roof pipe entry hatch back down into the interior of the building. The pipes or conduits may be electrical lines, or pipes with coolant and these may be easily inspected, repaired and maintained on the roof, rather than carried through the interior, floor or ceiling construction of the building.

Figure 4:
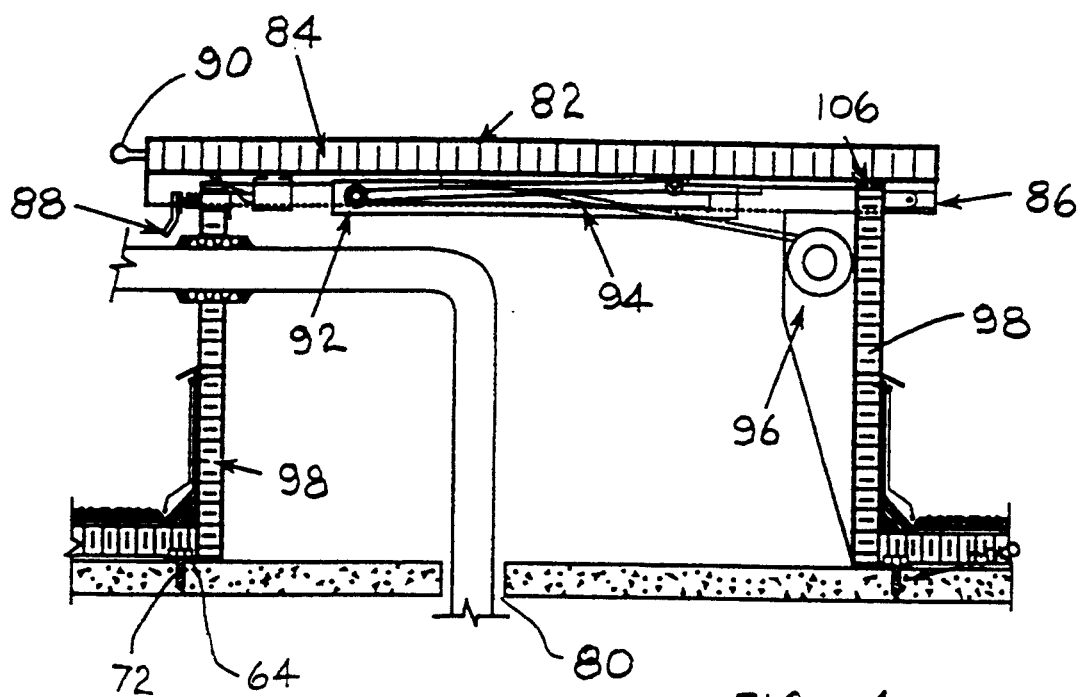
FIG. 4 is a full cross-sectional view of the roof pipe entry hatch.

The hole in the roof may either comprise a small hole 80 as illustrated in FIG. 4 or may be as large as the inside dimension of the upstanding side walls of roof pipe entry hatch 50 as illustrated in FIG. 3.

The roof pipe entry hatch 50 includes a cover 82 which is connected to one end of the upstanding side walls or curb 60. In particular, in the arrangement shown in FIGS. 3 and 4 the cover 82 is pivotly connected to upstanding side wall 58.

The cover 82 is adapted to move from a first or open position as shown in FIG. 3 so as to permit entry into the opening 62 and pipes or conduits 78 to a second or closed position illustrated in FIG. 4, so as to bar access to the opening 62.

The cover 82 may include rigid insulation such as glass fibre insulation 84 as well as pintle hinges 86. In one alternative embodiment, the cover 82 can include an exterior push release and padlock hasp 88 which may be activated to open the cover 82 in a manner well known to those persons skilled in the art. The cover 82 may also include an interior vinyl grip handle 90, gliding lock arm 94, and torsion spring lifting mechanism 96 as illustrated in FIG. 4.

The upstanding side walls or curb 60 may include rigid insulation 98 to the metallic surface of the upstanding side wall formations.

The roof pipe entry hatch also includes a metal or membrane flashing 100 which is adapted to extend between the roof membrane 66 and upstanding side walls 52 54, 56 and 58 so as to seal entry of weather conditions into the opening 80. A rain screen 102 projects exteriorally outwardly from the upstanding side walls above the flashing so as to further weather proof same. The insulated curb as described herein will accommodate all roof flashing systems.

A neoprene gasket 104 may be utilized along the top edge 106 of curb 60 so as to improve the weather sealing characteristics of the roof pipe entry hatch 50. Furthermore, the roof hatch cover 82 overlies or overlaps the upstanding side walls as best illustrated in FIG. 5 so as to improve the weather sealing characteristics of the hatch 50.

Figure 5:
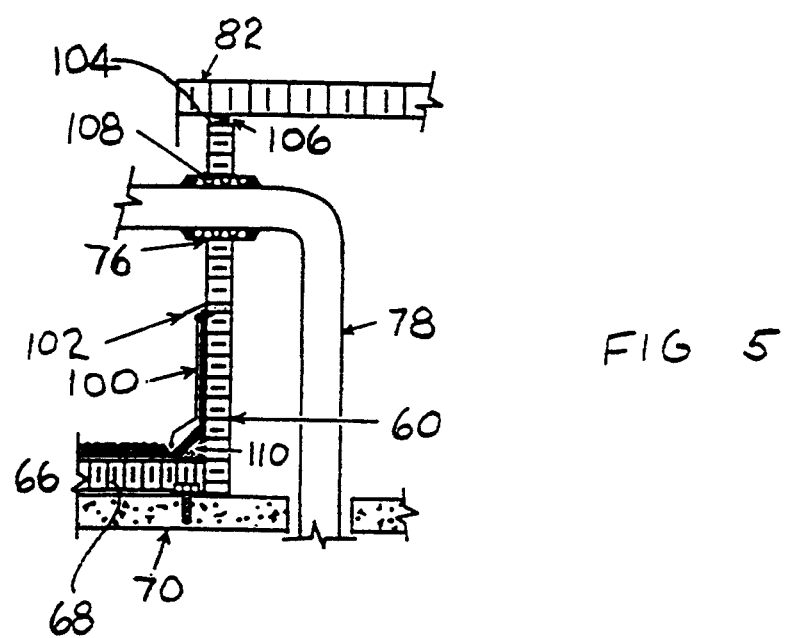
FIG. 5 is a partial cross-sectional view of the roof pipe entry hatch through one of the pipe penetrations.

The projecting peripheral edge 76 is shown in cross-section in FIG. 5 which is adapted to receive a conduit 78. Packing or sealant 108 may be inserted between the pipes and conduit 78 and the openings 74 so as to further seal same. Furthermore, a cant 110 is utilized.

It should be noted that pipe penetrations may be made on any curb side of the hatch. By utilizing the roof pipe entry hatch 50 as described herein, multiple entries into a building interior or exterior is accomplished while maintaining water proof integrity of any roofing or water proofing system. Furthermore, the roof pipe hatch mechanism described herein accommodates present or future installation of multiple entries of various roof projections.

The curb 60 can be mechanically fastened to the roof deck 70 as previously described and in one embodiment is constructed high enough to properly terminate any type of commercial roofing system including inverted roofs. For example the height of the flashing may be a minimum of eight inches or 200 millimeters. The piping 78 introduced through the vertical upstanding side walls allows for effective sealing and water and snow run off.

The roof pipe entry hatch 50 may include a ninety degree spring assisted door opening with hold open mechanisms as described above which permit easy access to clean, inspect, test or repair existing lines, or to install new lines as may be required. Moreover roof fire water access valves may be contained in the roof pipe entry, hatch 50 for emergency use. The future pipe openings may be capped and sealed until required. Furthermore, the cover 82 may be locked for security. The rain screen 102 may be welded to the curb 60 to protect the termination of the member flashing 100.

The roof pipe entry hatch 50 constructed in accordance with the invention described herein substantially eliminates the water proofing problems associated with multiple roof deck penetrations of conduits or pipes and particularly electrical conduits, coolant and gas pipes, and fire hose connections. The roof pipe entry hatch 50 effectively houses the pipe access holes in the roof deck while providing surface access to the area with an easy to use hatch door.

The curb 60 may be constructed of galvanized steel while the cover 82 may be constructed of aluminium. Alternatively, the curb 60 and cover 82 may be mill finished aluminium or primer coated galvanized steel.

Typically, the curb 60 may be constructed of 14 gauge galvanized steel or 11 gauge aluminium, while the cover 82 comprises of 14 gauge galvanized steel and 11 gauge aluminium. The cover 82 may be insulated with 25 millimeter or one inch thick glass fibre insulation while the curbs 60 may be insulated with 50 millimeter or two inch rigid roof insulation such as fibre board insulation. The flange 68 in the embodiment described herein is prepunched for fastener holes for securement to the roof deck 70.

Although the preferred embodiment as well as the operation and use have been specifically described in relation to the drawings, it should be understood that variations in the preferred embodiment could be achieved by a person skilled in the trade without departing from the spirit of the invention as claimed herein.

The embodiments of invention in which an exclusive property or privilege is claimed are defined as follows:

1. In a roof conduit entry hatch including:
   (a) vertically upstanding side wall means defining an opening;
   (b) a cover hinged to one end of said side wall means exteriorally of said opening;
   (c) aperture means disposed on vertically upstanding said side wall means for fixedly receiving conduits horizontally disposed through vertically upstanding side wall means and through said opening;
   (d) sealing means for sealing the interior of said roof conduit hatch against weather;
   (e) whereby said cover permits roof entry into said opening for access to said conduit means when said cover is in an open position and whereby said cover bars access to said opening and said conduits where said cover is in a closed position;
   (f) said aperture means including a horizontally projecting circumferential edge extending exteriorally from said vertically upstanding side wall means so as to enhance sealing between said aperture means and said conduits.

2. In a roof conduit entry hatch as claimed in claim 1 wherein said side wall means defines a curb.

3. In a roof conduit entry hatch as claimed in claim 2 wherein said curb includes four side walls defining a square or rectangular opening.

4. In a roof conduit entry hatch as claimed in claim 3 wherein said aperture means are disposed on two opposite side walls and said cover is hinged to one of said other two side walls.

5. In a roof conduit entry hatch as claimed in claim 4 wherein said aperture means include cap means for capping said aperture means to prevent access to said opening and for removing said cap means when said conduit is received by said aperture means.

6. In a roof conduit entry hatch as claimed in claim 5 wherein said side walls include insulation.

7. In a roof conduit entry hatch as claimed in claim 6 wherein said upstanding side walls include a flange adjacent said roof for fastening to said roof.

8. In a roof conduit entry hatch as claimed in claim 7 wherein said cover includes insulating means.

9. In a roof conduit entry hatch as claimed in claim 8 including a padlock hasp attached to said cover.

10. In a roof conduit hatch as claimed in claim 1 wherein said projecting circumferential edge also extends interiorally from said side wall means so as to enhance sealing between said aperture means and said conduits.

11. In a roof hatch as claimed in claim 10 further including a sealant inserted between said conduits and said aperture means.

12. In a roof entry hatch for receiving a plurality of pipe means through an opening in a horizontal roof deck comprising:
    (a) vertically upstanding side wall means defining a curb for enclosing said opening in said roof;
    (b) means for fastening said curb to said roof;
    (c) a plurality of pipe entry openings presented by said vertically upstanding curb for fixedly receiving a plurality of pipe means disposed horizontally through said curb and then vertically downwardly to said opening in said roof deck;
    (d) a cover hinged to one end of said curb moveable between an open position to permit roof entry to said opening and access to said pipe means to facilitate inspection, repair and maintenance of said pipe means from said roof and a closed position so as to bar access to said opening and said pipe means;
    (e) sealing means for sealing the interior of said roof entry hatch against weather;
    (f) said plurality of pipe entry openings each including a horizontally projecting circumferential edge extending both interiorally and exteriorally from said vertically upstanding curb so as to enhance sealing between said plurality of pipe means and said plurality of pipe entry means.

13. In a roof entry hatch as claimed in claim 12 further including a sealant inserted between said plurality of pipes and said circumferential edge respectively.

14. In a roof entry hatch as claimed in claim 13 wherein said cover overlaps said curb so as to seal said opening.

15. In a roof entry hatch as claimed in claim 14 wherein said cover includes a gasket between said cover and said curb to seal said opening in said closed position.

16. In a roof entry hatch as claimed in claim 15 including cap means capping said pipe entry openings for future use.

17. In a roof entry hatch as claimed in claim 16, including flashing means extending between said roof and said upstanding side walls for water proofing said opening.

18. In a roof entry hatch as claimed in claim 17 wherein said upstanding side walls include an outwardly projecting rain screen above said flashing.

* * * * *